US007971571B2

(12) United States Patent
Asano et al.

(10) Patent No.: US 7,971,571 B2

(45) Date of Patent: Jul. 5, 2011

(54) OPERATION CONTROL METHOD ON THE BASIS OF ION CURRENT IN INTERNAL COMBUSTION ENGINE

(75) Inventors: Morito Asano, Osaka (JP); Yoshiyuki Fukumura, Osaka (JP); Mitsuhiro Izumi, Osaka (JP); Kouichi Kitaura, Aichi-ken (JP); Kouichi Satoya, Aichi-ken (JP); Mamoru Yoshioka, Aichi-ken (JP)

(73) Assignees: Daihatsu Motor Co., Ltd., Osaka (JP); Diamond Electric Mfg. Co., Ltd., Osaka (JP); Toyota Jidosha Kabushiki Kaisha, Aichi-Ken (JP)

( * ) Notice: Subject to any disclaimer, the term of this patent is extended or adjusted under 35 U.S.C. 154(b) by 220 days.

(21) Appl. No.: 12/278,330

(22) PCT Filed: Jan. 31, 2007

(86) PCT No.: PCT/JP2007/051550

§ 371 (c)(1), (2), (4) Date: Aug. 5, 2008

(87) PCT Pub. No.: WO2007/091457

PCT Pub. Date: Aug. 16, 2007

(65) Prior Publication Data

US 2009/0050108 A1 Feb. 26, 2009

(30) Foreign Application Priority Data

Feb. 6, 2006 (JP) ................................ 2006-028122

(51) Int. Cl.

*F02P 5/00* (2006.01)

*G01L 23/22* (2006.01)

(52) U.S. Cl. ......... 123/406.26; 123/406.29; 123/406.34; 123/406.27; 123/406.55; 73/35.08

(58) Field of Classification Search ............ 123/406.26, 123/406.14, 406.27, 406.55, 685, 688, 689, 123/693, 697; 73/114.02, 114.08

See application file for complete search history.

(56) References Cited

U.S. PATENT DOCUMENTS 4,487,184 A 12/1984 Boning et al.

(Continued)

FOREIGN PATENT DOCUMENTS

JP 5-26091 A 2/1993

(Continued)

OTHER PUBLICATIONS

Japanese Office Action for Application No. 2006-002524 issued Nov. 10, 2009.

*Primary Examiner* — Erick Solis

*Assistant Examiner* — Sizo B Vilakazi

(74) *Attorney, Agent, or Firm* — Banner & Witcoff, Ltd.

(57) ABSTRACT

The present invention is an operation control method on the basis of an ion current in an internal combustion engine, the method comprising a step of detecting the ion current generated within a combustion chamber 30 so as to control an operating state of the internal combustion engine 100 on the basis of a state of the detected ion current, wherein a control at an engine start point in time on the basis of the state of the ion current is stopped for predetermined cycles just after the engine start.

3 Claims, 6 Drawing Sheets

U.S. PATENT DOCUMENTS

| | | | | |
|---|---|---|---|---|
| 4,987,771 | A | 1/1991 | Iwata | |
| 5,146,893 | A | 9/1992 | Ohsawa | |
| 5,207,200 | A | 5/1993 | Iwata | |
| 5,452,603 | A * | 9/1995 | Asano et al. | 73/114.67 |
| 5,563,332 | A | 10/1996 | Yasuda | |
| 5,598,821 | A | 2/1997 | Terata et al. | |
| 5,861,551 | A | 1/1999 | Morita et al. | |
| 5,925,819 | A | 7/1999 | Yoshinaga et al. | |
| 6,092,015 | A | 7/2000 | Takahashi et al. | |
| 6,230,546 | B1 * | 5/2001 | Wilstermann et al. | 73/35.08 |
| 6,328,016 | B1 * | 12/2001 | Takahashi et al. | 123/406.35 |
| 6,655,191 | B2 * | 12/2003 | Hohner et al. | 73/35.08 |
| 6,715,340 | B2 | 4/2004 | Yamada et al. | |
| 6,722,343 | B2 | 4/2004 | Uchida et al. | |
| 6,739,181 | B2 | 5/2004 | Honda | |
| 6,748,922 | B2 * | 6/2004 | Uchida et al. | 123/406.38 |
| 6,779,517 | B2 | 8/2004 | Sakakura | |
| 6,865,929 | B2 | 3/2005 | Okamura et al. | |
| 7,348,782 | B2 | 3/2008 | Ando | |
| 7,427,936 | B2 | 9/2008 | Takeuchi | |
| 7,448,253 | B2 | 11/2008 | Asano et al. | |
| 7,451,640 | B2 | 11/2008 | Asano et al. | |
| 7,509,940 | B2 * | 3/2009 | Takahashi et al. | 123/406.28 |
| 7,637,246 | B2 * | 12/2009 | Viele | 123/406.14 |
| 2003/0164026 | A1 | 9/2003 | Koseluk et al. | |
| 2003/0183195 | A1 | 10/2003 | Uchida et al. | |
| 2008/0028842 | A1 | 2/2008 | Asano et al. | |
| 2008/0030197 | A1 | 2/2008 | Fukumura et al. | |
| 2009/0050108 | A1 | 2/2009 | Asano et al. | |
| 2010/0154509 | A1 | 6/2010 | Asano et al. | |

FOREIGN PATENT DOCUMENTS

| | | | |
|---|---|---|---|
| JP | 08-144828 | | 6/1996 |
| JP | 11-13620 | A | 1/1999 |
| JP | 11-107897 | A | 4/1999 |
| JP | 2003-184635 | | 7/2003 |
| JP | 2003-286932 | A | 10/2003 |

* cited by examiner

OPERATION CONTROL METHOD ON THE BASIS OF ION CURRENT IN INTERNAL COMBUSTION ENGINE

This application is a national stage application of co-pending PCT application PCT/JP2007/051550 filed Jan. 31, 2007, which claims the benefit of Japanese non-provisional application serial number P2006-028122, filed Feb. 6, 2006, the disclosure of which is expressly incorporated herein.

TECHNICAL FIELD

The present invention relates to an operation control method of detecting an ion current generated within a combustion chamber and controlling an operating state of an internal combustion on the basis of a state of the ion current.

BACKGROUND ART

Conventionally, in an internal combustion engine (hereinafter, refer to as an engine) mounted to a vehicle, it is attempted to determine a combustion state by detecting an ion current generated within a combustion chamber. Specifically, the structure is made such as to detect the ion current on the basis of a fact that the ion current generated in the combustion chamber after an ignition is greater than a threshold level set for detecting, and determine on the basis of the detected ion current whether or not a combustion state is good.

For example, an invention disclosed in Patent Document 1 is structured such as to start a detection of an ion current at a point in time when a starter starts rotating and a fuel injection is started. Further, a characteristic of the ion current is measured on the basis of a time obtained by summing up times at which the detected ion current is greater than a set value, or a time at which the ion current is generated in a period from the ignition to a final point in time when the ion current is greater than the set value, whereby the combustion state is determined.

Patent Document 1: Japanese Unexamined Patent Publication No. 11-107897

In this case, the ion current is measured by detecting an ion current flowing between an inner wall of the combustion chamber and a center electrode of a spark plug, and between the electrodes of the spark plug, on the basis of a matter that a measuring voltage (a bias voltage) for measuring the ion current is applied to the spark plug after an ignition of the spark plug.

In this case, in a state in which a wall surface temperature of the combustion chamber is sufficiently high, the wall surface comes to a state capable of preferably seizing an electron, that is, an ion generated by the combustion, and it is possible to detect a current value of the ion current which accurately reflects the combustion state.

However, the wall surface temperature of the combustion chamber is going to rise little by little while absorbing a heat of a flame in accordance with a repeat of the combustion after an engine start point in time. Further, a current value of the ion current detected between the inner wall of the combustion chamber and the center electrode of the spark plug becomes higher in correspondence to an ascent of the inner wall of the combustion chamber, that is, the wall surface. In other words, since the wall surface temperature is low just after the engine start, it is impossible to sufficiently seize the ion in accordance with the combustion. As a result, even if a normal combustion is generated within the combustion chamber, there appears a tendency that the current value of the ion current detected between the inner wall of the combustion chamber and the center electrode of the spark plug becomes smaller, for example, than that after warm-up of the engine.

Further, if the combustion state is determined on the basis of the ion current even at a time of starting in a predetermined cycle just after the engine start as described in the Patent Document mentioned above, in the similar manner as the other cases except the predetermined cycle, there is determined on the basis of a value of the ion current detected small in spite of a normal combustion, for example, that the combustion state is lowered or a state close to a misfire. A rich state of an air fuel ratio is caused by erroneously carrying out a control for avoiding the reduction of the combustion or the misfire on the basis of the determination mentioned above, and as a result, there is generated a matter that an exhaust emission is unnecessarily increased.

DISCLOSURE OF THE INVENTION

Accordingly, an object of the present invention is to correctly determine a combustion state in several cycles just after an engine start, in a structure controlling an operating state of an internal combustion engine on the basis of an ion current generated within a combustion chamber.

In other words, in accordance with the present invention, there is provided an operation control method on the basis of an ion current in an internal combustion engine, the method comprising a step of detecting the ion current generated within a combustion chamber so as to control an operating state of the internal combustion engine on the basis of a state of the detected ion current, wherein a control at an engine start point in time on the basis of the state of the ion current is stopped for predetermined cycles just after at the engine start point in time.

In the present specification, “predetermined cycles” indicates the number of cycles from just after the engine start, particularly an initial explosion to a state in which a wall surface temperature of the combustion chamber rises up to a temperature which does not absorb a heat from a flame by repeating the combustion.

In accordance with the structure mentioned above, since it is possible to start the control based on the ion current after it becomes possible to accurately detect the ion current, it is possible to effectively avoid a problem that an erroneous control is carried out by determining on the basis of the ion current which is detected smaller in the predetermined cycles just after the engine start.

Further, in accordance with the present invention, there is provided an operation control method on the basis of an ion current in an internal combustion engine comprising the steps of; detecting the ion current generated within a combustion chamber so as to control an operating state of the internal combustion engine on the basis of a state of the detected ion current, measuring a current value of the ion current when starting the internal combustion engine, and correcting the measured current value for predetermined cycles just after an engine start in such a manner as to increase the value.

In this case, “increase the value” is not limited, for example, to such a method of multiplying the measured current value by a predetermined coefficient which is more than 1, but includes an aspect of adding a predetermined numerical value, an aspect of enlarging the current value on the basis of a predetermined computation in accordance with a combination of them and the like. Further, the coefficient and the numerical value for enlarging the value are not limited to be fixed, but may be appropriately changed between the engine start and the predetermined cycles.

In the structure mentioned above, it is possible to improve a reliability of the determination of the combustion state in several cycles just after the engine start, by correcting so as to enlarge the ion current detection value while taking the fact that the wall surface temperature is low into consideration.

Further, in accordance with the present invention, there is provided an operation control method on the basis of an ion current in an internal combustion engine comprising the steps of; detecting the ion current generated within a combustion chamber so as to control an operating state of the internal combustion engine on the basis of a state of the detected ion current, and determining a combustion by detecting the ion current which is greater than a set determination value, wherein the combustion is determined for predetermined cycles just after an engine start point in time by detecting the ion current which is greater than a determination value which is lower than the other cases except the predetermined cycle.

With this structure, since the low determination value is set while taking account into the fact that the wall surface temperature is low, it is possible to improve a precision for determining the combustion state on the basis of the ion current detection value in several cycles just after the engine start.

Further, if the control of the operating state mentioned above is constituted by a lean burn control at an engine start point in time at which the air fuel ratio is generally made rich, it is possible to reduce the exhaust emission from the time of the engine start and improve the fuel consumption. Further, if the control of the operating state mentioned above is constituted by a misfire preventing control, it is possible to preferably prevent an erroneous determination of the misfire just after the engine start.

Since the present invention can accurately determine the combustion state in several cycles just after the engine start, by employing the structure mentioned above, it is possible to more accurately control on the basis of the ion current even just after the engine start, by carrying out the control of the engine on the basis of the determination.

Further, in recent years, since it is remarked to carry out the control for the purpose from the start time of the engine in the control affecting the exhaust gas, it is possible to effectively avoid the generation of the rich state of the air fuel ratio even several cycles just after the engine start, by employing the operation control method on the basis of the ion current in accordance with the present invention, and it is possible to preferably carry out the control capable of suppressing the exhaust emission and improving the fuel consumption from the engine start.

BEST MODE FOR CARRYING OUT THE INVENTION

First Embodiment

A first embodiment of the present invention will be described with reference to the drawings.

Figure 1:
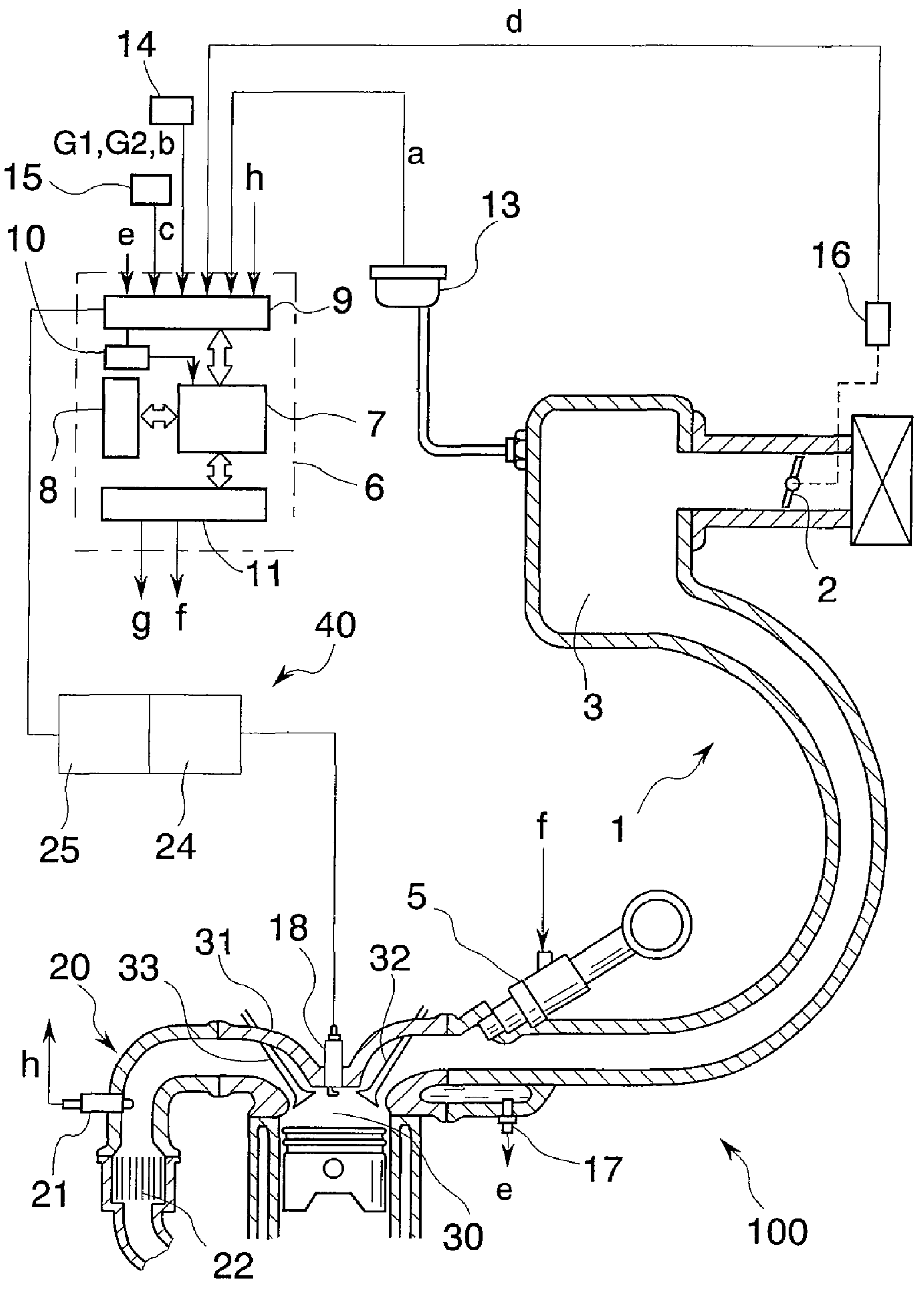
FIG. 1 is an explanatory view of a schematic structure showing a schematic structure of an engine and an electronic control device in accordance with a first embodiment of the present invention.

An engine 100 schematically shown in FIG. 1 is of a spark ignition type four cycle four cylinder engine for a motor vehicle, and is structured such that a throttle valve 2 opening and closing in response to an accelerator pedal (not shown) is arranged in an intake system 1, and a surge tank 3 is provided in a downstream side of the throttle valve 2. A fuel injection valve 5 is further provided near one end portion communicating with the surge tank 3, and the fuel injection valve 5 is structured such as to be controlled by an electronic control device 6. An intake valve 32 and an exhaust valve 33 are arranged in a cylinder head 31 forming a combustion chamber 30, and a spark plug 18 forming an electrode for generating a spark and detecting an ion current I is attached to the cylinder head 31. Further, an $O_2$ sensor 21 for measuring an oxygen concentration in the exhaust gas is attached to an upstream position of a three-way catalyst 22 corresponding to a catalyst device arranged in a pipe line until reaching a muffler (not shown), in the exhaust system 20. Here, FIG. 1 illustrates as a representative of a structure of one cylinder of the engine 100.

The electronic control device 6 is mainly constructed by a microcomputer system which includes a central processing unit 7, a memory device 8, an input interface 9, an output interface 11, and an A/D converter 10. To the input interface 9, there are input an intake pressure signal a which is output from an intake air pressure sensor 13 for detecting a pressure within the surge tank 3, that is, an intake pipe pressure, a cylinder determination signal G1, a crank angle reference position signal G2 and an engine rotating speed signal b which are output from a cam position sensor 14 for detecting a rotating state of the engine 100, a vehicle speed signal c which is output from a vehicle speed sensor 15 for detecting a vehicle speed, an IDL signal d which is output from an idle switch 16 for detecting an opened and closed state of the throttle valve 2, a water temperature signal e which is output from a water temperature sensor 17 for detecting a cooling water temperature of the engine 100, a current signal h which is output from the above $O_2$ sensor 21 and the like. On the other hand, a fuel ignition signal f is output to the fuel injection valve 5, and an ignition pulse g is output to a spark plug 18, from the output interface 11.

A power supply 24 for bias for measuring an ion current I is connected to the sparkplug 18, and a circuit 25 for measuring the ion current is connected between the input interface 9 and the bias power supply 24. An ion current detection system 40 is constructed by the spark plug 18, the bias power supply 24, the ion current measuring circuit 25 and a diode 23. The bias power supply 24 is structured such as to apply a measuring voltage (a bias voltage) for measuring the ion current I to the spark plug 18 at a point in time when the ignition pulse g disappears. Further, the ion current I flowing between an inner wall of the combustion chamber 30 and a center electrode of the spark plug 18, and between the electrodes of the sparkplug 18, on the basis of an application of the measuring voltage is measured by the ion current measuring circuit 25. Further, the ion current measuring circuit 25 outputs an ion current signal corresponding to a current value of the measured ion current I to the electronic control device 6. The bias power supply 24 and the ion current measuring circuit 25 can employ various structures which have been well known in the field.

Figure 2:
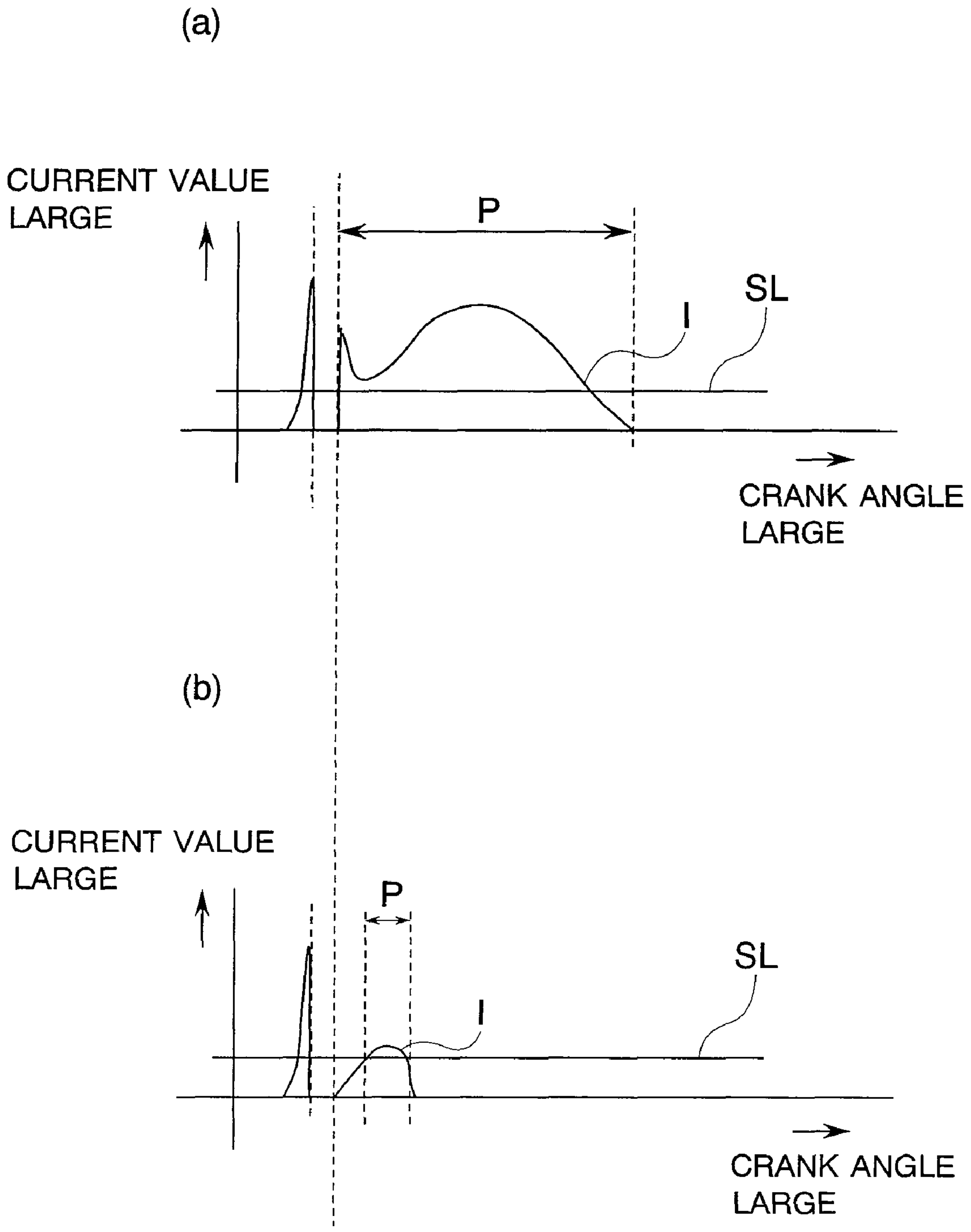
FIG. 2 is a graph showing a current wave form of an ion current of the embodiment.

The ion current I first indicates a wave form flowing rapidly just after the generation of the ion current, as shown in FIG. 2(*a*). Thereafter, in the case that the wall surface temperature of the combustion chamber 30 is sufficiently high in the good combustion state near the stoichiometric air fuel ratio, there is shown such a wave form that the current value is increased again together with an elapse of the time after being reduced before a top dead center (not shown), and becomes maximum near a crank angle at which a combustion pressure becomes maximum. Further, the ion current I is reduced little by little and generally disappears near an end of an expansion stroke.

Further, as shown in FIG. 2(*b*), in the case that the combustion state is not good due to some reason and exhibits a combustion close to a misfire, there is shown a waveform flowing rapidly in the same manner just after the generation, and thereafter there is shown a wave form that the current value is lower than FIG. 2(*a*) on the whole because the combustion pressure does not sufficiently rise up.

In order to determine the combustion state on the basis of the ion current I showing the current wave form as mentioned above, a threshold level SL corresponding to a determination level is previously set, a period for which the current value of the ion current I or the voltage caused by the current is greater than the threshold level SL is obtained as the generation period P, and whether or not the normal combustion state is established is determined on the basis of the generation period P.

Figure 3:
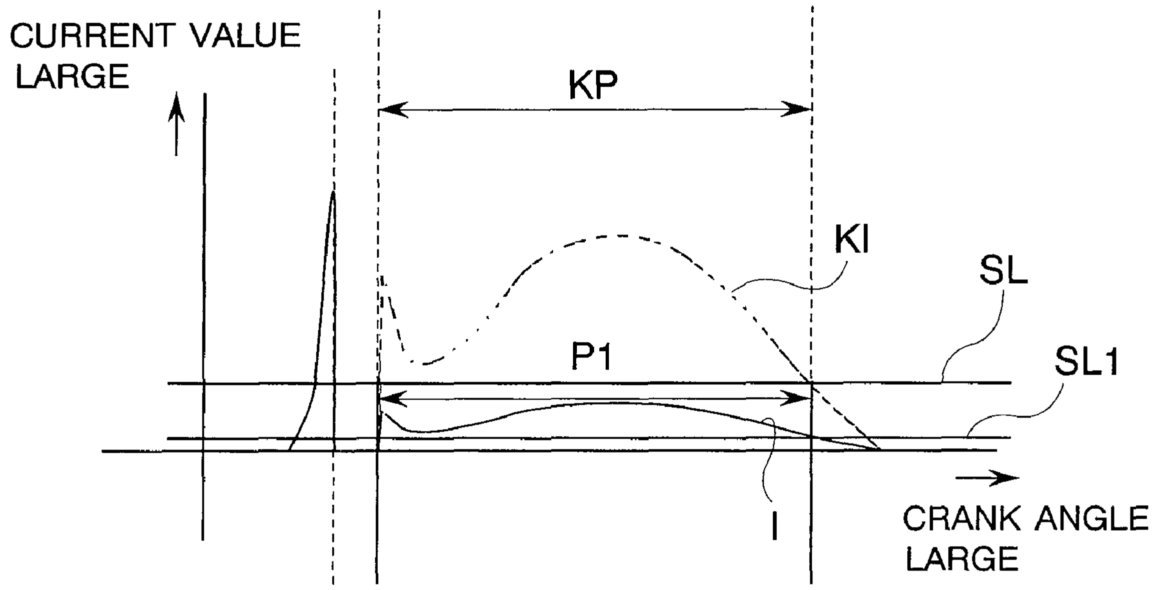
FIG. 3 is a graph showing the current wave form of the ion current of the embodiment.

Further, FIG. 3 shows a detection wave form of the ion current I in accordance with a normal combustion state from just after the initial explosion of the engine 100 in the cold engine start to predetermined cycles. As shown in FIG. 3, the rapidly flowing wave form is shown just after the generation of the ion current I in the same manner as FIGS. 2(*a*) and 2(*b*), however, the thereafter detected wave form appears smaller in comparison with FIG. 2(*a*) in which the normal combustion is executed. The detection wave form mentioned above is formed because the temperature of the wall surface of the combustion chamber 30 does not sufficiently rise up from just after the initial explosion of the engine 100 to the predetermined cycles, and the engine is in such a stage that the temperature rises up while absorbing the heat of the flame in accordance with the combustion, and is in a state which can not sufficiently seize the ion current I in accordance with the combustion. In this case, FIG. 3 illustrates a virtual ion current KI, a virtual generation period PK, a threshold level SL1 at the engine start point in time and a generation period P1 at the engine start point in time in addition to the ion current I, however, they will be explained in a second embodiment and a modified embodiment thereof mentioned below.

Accordingly, in the present embodiment, the electronic control device 6 is structured such as to appropriately control the operation of the engine 100, and determine the combustion state by detecting the ion current I flowing within the combustion chamber 30 per ignition, and incorporates a program for stopping the determination of the combustion state on the basis of the detection value of the ion current I for predetermined cycles just after the initial explosion of the engine 100 in the cold engine start.

Figure 4:
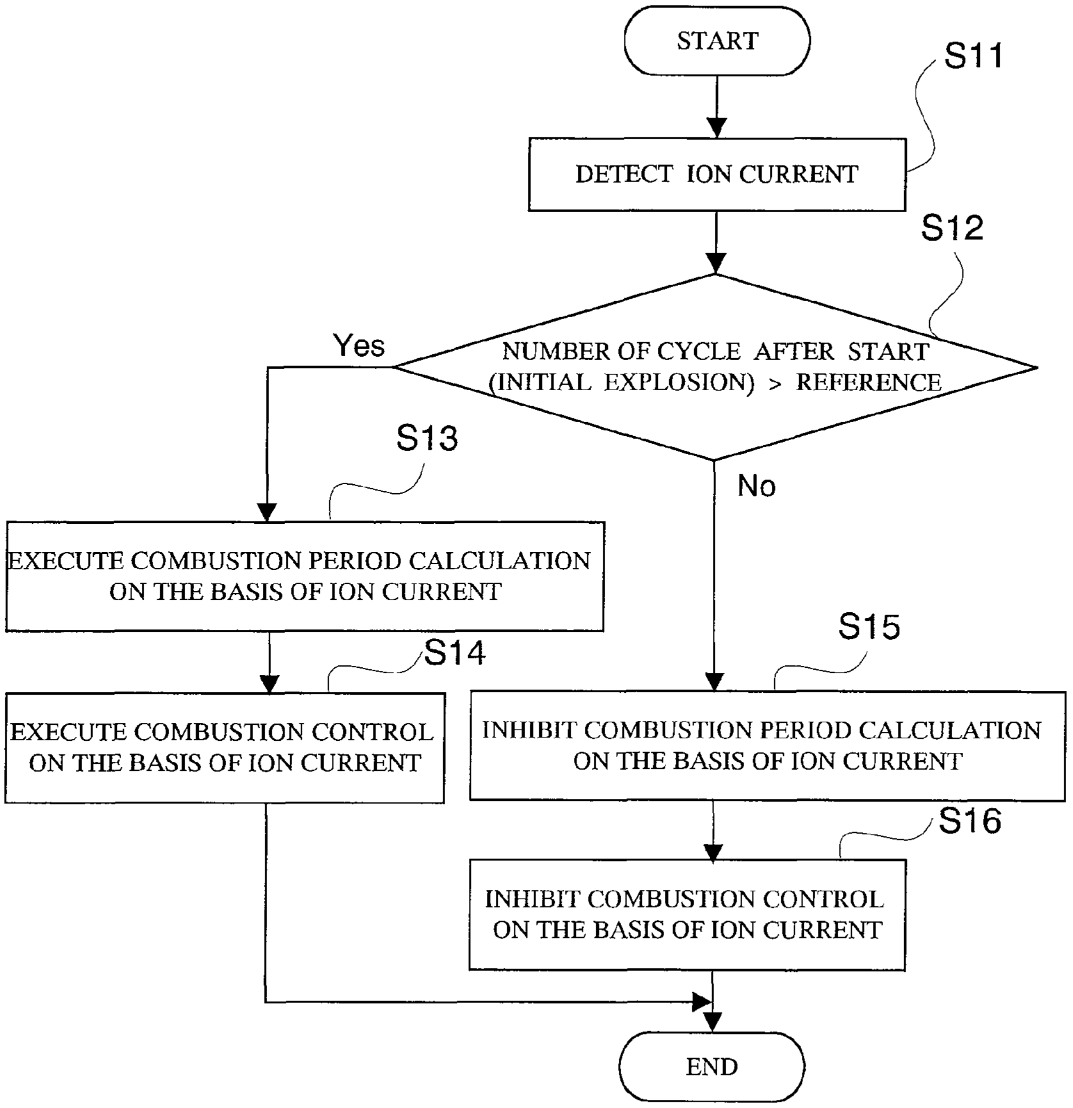
FIG. 4 is a flow chart showing a control procedure of the embodiment.

An outline of the program in accordance with the ion current I is as shown in FIG. 4.

In other words, after detecting the ion current I is finished in the step S11, it is determined whether or not the number of cycles after the initial explosion of the engine 100 is more than a reference value corresponding to a predetermined number of cycles in the step S12. Further, in the case that the determined number of cycles is more than the reference value, the step S13 is subsequently executed. Further, in the case that the determined number of cycles is less than the reference value, the step S15 is subsequently executed.

In the step S13, determined is the combustion state by executing a combustion period calculation on the basis of the detected ion current I. In the step S14, executed is a combustion control on the basis of the combustion state determined by the step S13.

On the other hand, in the step S15, inhibited is the combustion period calculation on the basis of the ion current I. Further, in the step S16, stopped is the combustion control on the basis of the ion current I. In this case, in the present embodiment, the other combustion control which is not based on the ion current I is appropriately carried out.

In the structure mentioned above, if the engine 100 is started, the steps S11, S12, S15 and S16 are repeatedly executed until becoming greater than the reference value after the initial explosion. Accordingly, the combustion control such as a lean burn control and the like is not executed on the basis of the ion current I during this period.

After the time has passed so as to reach the operating state which is greater than the reference value from the initial explosion, the steps S11, S12, S13 and S14 are executed.

Accordingly, since the operation control method on the basis of the ion current I of the internal combustion engine in accordance with the present embodiment can start the control on the basis of the ion current I after the wall surface of the combustion chamber 30 comes to the temperature which can accurately detect the ion current I after passing the predetermined cycles after the initial explosion, by stopping the control for the engine start point in time on the basis of the state of the ion current I for the predetermined cycles just after the initial explosion in the cold engine start, it is possible to effectively avoid the problem that the control for the engine start point in time is carried out on the basis of the different determination from the actual combustion state on the basis of the detected ion current I, in the predetermined cycles just after the engine start.

Further, the present invention is not limited to the first embodiment. A second embodiment and a modified embodiment according to the present invention will be described below.

Second Embodiment

Next, A second embodiment of the present invention will be described. In the embodiment, the same reference numerals as those of the embodiment mentioned above are attached to the elements executing the same operations as those of the embodiment mentioned above, and a detailed description thereof will be omitted.

The electronic control device 6 is structured such as to determine the combustion state by detecting the ion current I flowing within the combustion chamber 30 per ignition in the same manner as the first embodiment mentioned above, and has a program starting the measurement of the current value of the ion current I at a time of starting the internal combustion engine and correcting the measured current value so as to enlarge the value for predetermined cycles just after the engine start. Specifically, there is incorporated a program set such as to calculate a virtual ion current KI obtained by multiplying the measured current value by a coefficient K for the predetermined cycles just after the engine start, that is, the initial explosion.

In the present embodiment, the coefficient K is a predetermined value which is previously set on the basis of a detected value of the ion current I detected in the case that the wall surface temperature of the combustion chamber 30 is sufficiently high, and a detected value of the ion current I detected in the case that the wall surface temperature of the combustion chamber 30 does not sufficiently rise up, for example, which is greater than 1. Further, the coefficient K may be changed in correspondence to the number of cycles after the initial explosion of the engine 100. This is for the purpose of accurately corresponding to the ascent of the wall surface temperature of the combustion chamber 30 in accordance with the cycle number after the initial explosion. In this case, the coefficient K is set to the greatest value just after the engine start, and is set such that the value becomes smaller per ignition.

The virtual ion current KI is set such as to come close to the detected value of the ion current I detected in the case that the wall surface temperature of the combustion chamber 30 is sufficiently high, by multiplying the detected value of the ion current I detected in the case that the wall surface temperature of the combustion chamber 30 does not sufficiently rise up by the coefficient K.

Figure 5:
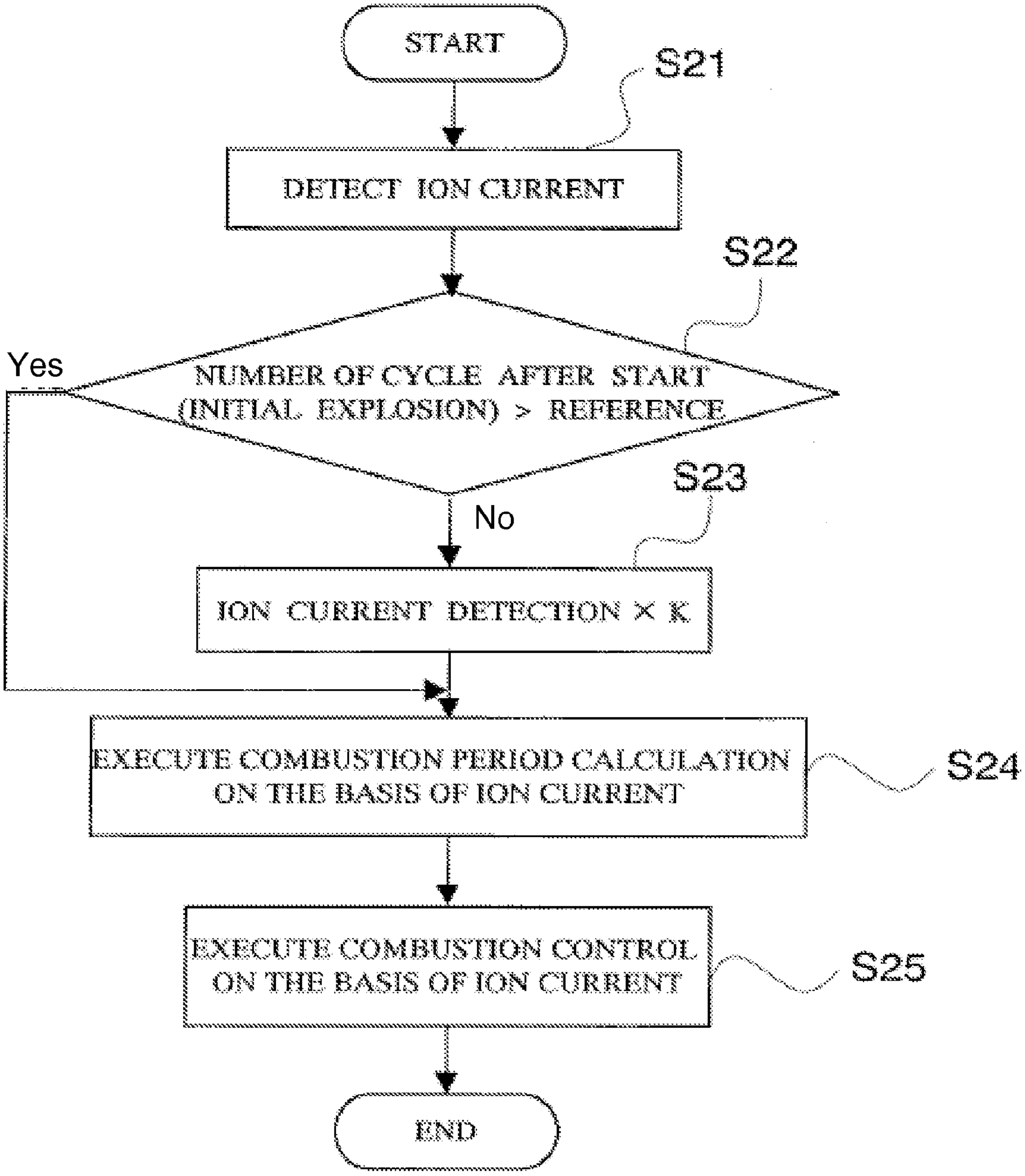
FIG. 5 is a flow chart showing a control procedure in accordance with a second embodiment of the present invention.

An outline of the program on the basis of the ion current I is as shown in FIG. 5.

In other words, after the step S21 detecting the ion current I is finished, it is determined whether or not the number of cycles after the start of the engine 100 is more than a predetermined reference value in the step S22. Further, in the case that the number of the determined cycles after the engine start is more than the reference value, the step S24 is subsequently executed. Further, in the case that the number of determined cycles is less than the reference value, the step S23 is subsequently executed.

In the step S23, calculated is the virtual ion current KI obtained by multiplying the detected ion current I by the predetermined coefficient K.

The step S24 calculates the generation period P or the virtual generation period KP by carrying out the similar combustion period calculation on the basis of the detected ion current I or the value of the virtual ion current KI, and determines the combustion state. In other words, in the case that in the step S22 it is determined that the number of cycles after the initial explosion is more than the reference value (No), the period in which the ion current I is greater than the threshold level SL is set to the generation period P, and the determination of the combustion state is executed on the basis of the generation period P. On the other hand, in the case that in the step S22, it is determined that the number of cycles after the initial explosion is less than the reference value (Yes), the period in which the virtual ion current KI is greater than the threshold level SL is set to the virtual generation period KP, and the determination of the combustion state is executed on the basis of the virtual generation period KP.

In the step S25, executed is the combustion control on the basis of the combustion state determined by the step S24. As the combustion control on the basis of the combustion state, there is appropriately executed a control which affects the exhaust gas such as a misfire preventing control, a lean burn control, an EGR control and the like.

In the structure mentioned above, if the engine 100 is started, the steps S21, S22, S23, S24 and S25 are repeatedly executed until becoming greater than the reference value from the initial explosion. Accordingly, the combustion control such as the lean burn control is executed on the basis of the virtual ion current KI during this time.

After the time has passed so as to reach the operating state which is greater than the reference value from the initial explosion, the steps S21, S22, S24 and S25 are executed. Accordingly, the combustion control such as the lean burn control is executed on the basis of the ion current I during this time.

Accordingly, it is possible to effectively improve a reliability in accordance with the determination of the combustion state in several cycles just after the engine start, by multiplying the ion current I by the coefficient K in such a manner as to enlarge the detected value of the ion current I while taking into consideration the fact that the wall surface temperature of the combustion chamber 30 is low during the predetermined cycles just after the engine start in the cold engine start, thereby correcting to the virtual ion current KI which is made come close to the value of the ion current I detected in the state in which the wall surface temperature is sufficiently high.

Further, in accordance with the program, it is possible to detect the lean burn state and the misfire state as shown in FIG. 2(*b*), on the basis of the virtual ion current KI obtained by multiplying the ion current I by the coefficient K, for example, without depending on the determination by the $O_2$ sensor 21, at a time of starting the engine 100, particularly in the case that the wall surface temperature of the combustion chamber 30 is low. In other words, it is possible to accurately carry out the determination of the combustion state even in the case that the wall surface temperature of the combustion chamber 30 is low, by carrying out the determination of the combustion state from the initial explosion of the engine 100 to the predetermined cycles which can not be determined by the $O_2$ sensor 21 and is hard to be accurately determined particularly in the combustion state by the ion current I, on the basis of the virtual ion current KI and the virtual generation period KP obtained by carrying out the combustion period calculation on the basis of the virtual ion current KI.

Further, if the misfire preventing control is approximately executed on the basis of the determination of the combustion state mentioned above, it is possible to accurately detect the misfire from the initial explosion of the engine 100. In addition, if the control affecting the exhaust gas such as the lean burn control is approximately executed on the basis of the determination of the combustion state mentioned above, it is possible to preferably carry out the lean burn control at the engine start point in time which can effectively reduce the emission of the exhaust gas at a time of the initial explosion of the engine 100, can effectively avoid the rich state of the air fuel ratio, and can improve the fuel consumption.

Further, since in the step S24, calculated are the generation period P and the virtual generation period KP in accordance with the same combustion period calculation respectively with respect to the ion current I and the virtual ion current KI, it is possible to simplify the program for determining the combustion state.

Modified Embodiment

Next, The modified embodiment of the second embodiment will be described. In the modified embodiment, the same reference numerals as those of the embodiment are attached and a detailed description thereof will be omitted. However, the electronic control device 6 is structured such as to control the operation of the engine 100 as mentioned above, and detect the ion current I flowing within the combustion chamber 30 per ignition so as to determine the combustion state. Further, the electronic control device 6 has a program for determining the combustion state by setting the time detecting the ion current I which is greater than the threshold level SL1 at the engine start point in time corresponding to the determination value lower than the other cases than the predetermined cycles to the generation period P1 at the engine start point in time, for the predetermined cycles just after the engine start, that is, the initial explosion.

In the present embodiment, the threshold level SL1 at the engine start point in time is previously set to a predetermined value on the basis of the detected wave form of the ion current I in accordance with the similar combustion state detected in each of the case that the wall surface temperature of the combustion chamber 30 is low, and the case that the wall surface temperature is sufficiently high. Specifically, it is set such that a timing at which the detected wave form of the ion current I detected in the case that the wall surface temperature of the combustion chamber 30 is sufficiently high cuts across the threshold level SL becomes approximately equal to a timing at which the detected wave form of the ion current I showing the similar combustion state and detected in the case that the wall surface temperature is low cuts across the threshold level SL1 at the engine start point in time. In this case, the threshold level SL1 at the engine start point in time is made larger than a noise level in the case of detecting the ion current I and is set such as to prevent the ion current I from being erroneously detected. Further, the threshold level SL1 at the engine start point in time may be set such that the value is changed in correspondence to the number of cycles after the initial explosion, in the present modified embodiment. This is for the purpose of accurately correspond to the ascent of the wall surface temperature of the combustion chamber 30 in accordance with the number of cycles after the initial explosion. Specifically, it is preferable to set the threshold level SL1 at the engine start point in time to a smallest value just after the initial explosion, and thereafter enlarge the value per ignition so as to come close to the threshold lever SL little by little.

The generation period P1 at the engine start point in time corresponds to a period in which the ion current I detected in the state in which the wall surface temperature of the combustion chamber 30 is low is greater than the threshold level SL1 at the engine start point in time. In the present embodiment, it is a predetermined value which is previously set on the basis of the ion current I mentioned above. Specifically, since it is set such that the timing at which the ion current I detected in the case that the wall surface temperature of the combustion chamber 30 is sufficiently high exceeds the threshold level SL becomes approximately equal to the timing at which the ion current I showing the same combustion state and detected in the case that the wall surface temperature is low exceeds the threshold level SL1 at the engine start point in time, the generation period P and the generation period P1 at the engine start point in time show approximately the similar timing and period.

Figure 6:
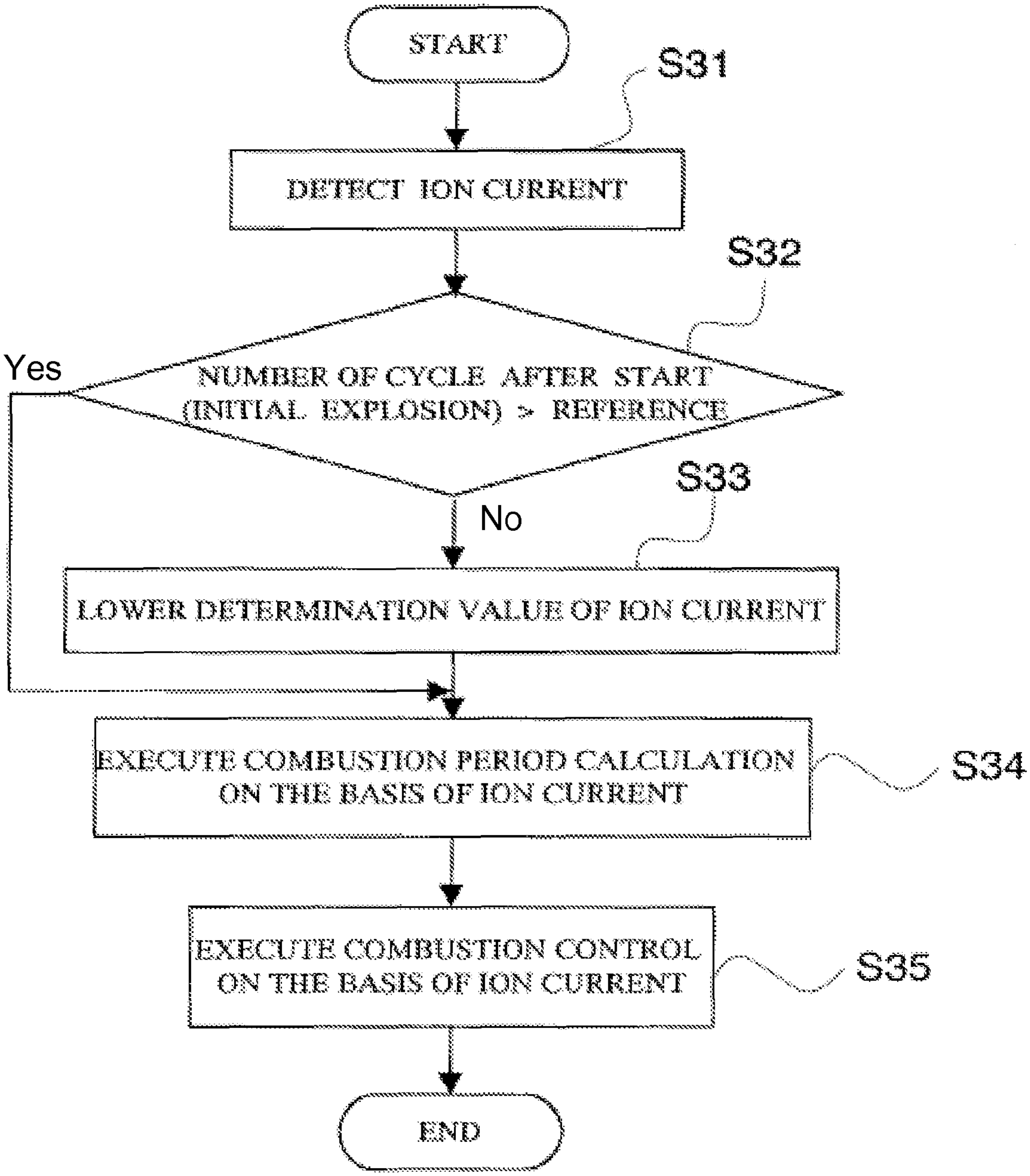
FIG. 6 is a flow chart showing a control procedure in accordance with a modified embodiment of the embodiment.

An outline of the program in accordance with the ion current I is as shown in FIG. 6.

In other words, after a step S31 detecting the ion current I is finished, in the step S32, it is determined whether or not the number of cycles after the start of the engine 100, that is, the number of cycles after the initial explosion is more than the reference value in accordance with the number of predetermined cycles which is previously determined. Further, in the case that it is determined that the number of cycles after the initial explosion is more than the reference value, subsequently the step S34 is executed. Further, in the case that it is determined that the number of cycles after the initial explosion is less than the reference value, the step S33 is subsequently executed.

In the step S33, carried out is a process of changing a determination value for carrying out the combustion period calculation on the basis of the detected ion current I from the threshold level SL to the start time threshold level SL1. In other words, carried out is a process of lowering the determination value from the threshold level SL to the threshold level SL1 at the engine start point in time.

In the step S34, set is a period in which the ion current I is greater than the threshold level SL to the generation period P, and executed is the determination of the combustion state on the basis of the generation period P, in the case that the number of cycles determined in the step S32 is more than the reference value (No). On the other hand, in the case that the number of cycles determined in the step S32 is less than the reference value (Yes), a period in which the ion current I is greater than the threshold level SL1 is set to the generation period P1 at the engine start point in time, and the determination of the combustion state in the similar manner as mentioned above is executed on the basis of the generation period P1 at the engine start point in time.

In the step S35, executed is the combustion control on the basis of the combustion state determined by the step S34. As a combustion control on the basis of the combustion state, there is approximately executed a control affecting the exhaust gas such as the misfire preventing control, the lean burn control.

In the structure mentioned above, if the engine 100 is started, the steps S31, S32, S33, S34 and S35 are repeatedly executed until becomes greater than the reference value from the initial explosion. Accordingly, the combustion control such as the lean burn control is executed on the basis of the threshold level SL1 at the engine start point in time during this period.

After the time has passed thereafter so as to reach the operating state which is greater than the reference value from the initial explosion, the steps S31, S32, S34 and S35 are executed. Accordingly, the combustion control such as the lean burn control is executed on the basis of the threshold level SL during this period.

Accordingly, determined is the combustion state on the basis of the generation period P1 at the engine start point in time by setting the time detecting the ion current I which is greater than the threshold level SL1 at the engine start point in time corresponding to the determination value which is lower than that in the other cases than the predetermined cycles to the generation period P1 at the engine start point in time, for the predetermined cycles just after the engine start in the cold engine start. In other words, since there is set the determination value taking into consideration the fact that the wall surface temperature of the combustion chamber 30 is low, that is, the threshold level SL1 at the engine start point in time for several cycles just after the start of the engine 100, it is possible to effectively improve the precision of the determination of the combustion state on the basis of the generation period P1, by calculating the generation period P1 which is approximately equal to the generation period P in the period and the timing, on the basis of the detected value of the ion current I in several cycles just after the initial explosion.

Further, if the misfire preventing control is appropriately executed on the basis of the determination of the combustion state mentioned above, the misfire can be prevented from the initial explosion of the engine 100. In addition, if the control affecting the exhaust gas such as the lean burn control is appropriately executed on the basis of the determination of the combustion state mentioned above, it is possible to preferably carry out the lean burn control at the engine start point in time which can effectively reduce the emission of the exhaust gas, can effectively avoid the rich state of the air fuel ratio and can improve the fuel consumption at a time of the initial explosion of the engine 100.

Further, since in the step S34, determined is the combustion state in the similar manner on the basis of the generation period P and the generation period P1 at the engine start point in time, it is possible to simplify the program for determining the combustion state.

The description is given above of the embodiments in accordance with the present invention, however, the present invention is not limited to the embodiments mentioned above.

For example, there can be considered a case that the ion current can be well detected from the engine start point in time, for example, by a remaining heat in accordance with the combustion at a time of the previous operation, even at a time of starting the engine. Taking such the case into consideration, the above control may be executed only at a time of the cold engine start.

Further, in the case that the determination of the combustion state in accordance with the embodiments is applied to a start time EGR control, there is provided an aspect that the combustion state is determined on the basis of the ion current, and an amount of EGR is appropriately changed on the basis of the result of determination. In accordance with such the aspect, since it is possible to suitably set the amount of EGR circulated to the intake system even at the engine start point in time, it is possible to suitably suppress a generating amount of NOx in the exhaust gas.

In addition, the specific structure of each of the portions is not limited to the embodiments mentioned above, but can be variously modified within the scope of the present invention.

INDUSTRIAL APPLICABILITY

The present invention can be widely applied to the spark ignition type internal combustion engine mounted to the vehicle or the like including the motor vehicle, which is structured such as to generate the ion current by using the spark plug just after starting the combustion. Further, in the internal combustion engine mentioned above, the present invention can increase the determining accuracy of the operating state on the basis of the ion current even just after the engine start, and can carry out the accurate control on the basis of the ion current, by accurately determining the combustion state just after the engine start on the basis of the ion current.

The invention claimed is:

1. An operation control method on the basis of an ion current in an internal combustion engine comprising the steps of:

detecting the ion current generated within a combustion chamber so as to control an operating state of the internal combustion engine on the basis of a state of the detected ion current;

measuring a current value of the ion current;

determining if the current value of the ion current was measured during a predetermined cycle between the engine start and a time when a wall surface temperature of the combustion chamber reaches a high enough temperature such that it does not absorb heat from a flame from repeated combustion in the combustion chamber; and correcting the measured current value of the ion current by increasing the value upon determining that the current value of the ion current was measured during the predetermined cycle.

2. The operation control method on the basis of an ion current in an internal combustion engine according to claim 1, wherein the control of the operating state is constituted by a lean burn control at the engine start point in time.

3. The operation control method on the basis of an ion current in an internal combustion engine according to claim 1, wherein the control of the operating state is constituted by a misfire preventing control.

* * * * *